Patented Aug. 19, 1930

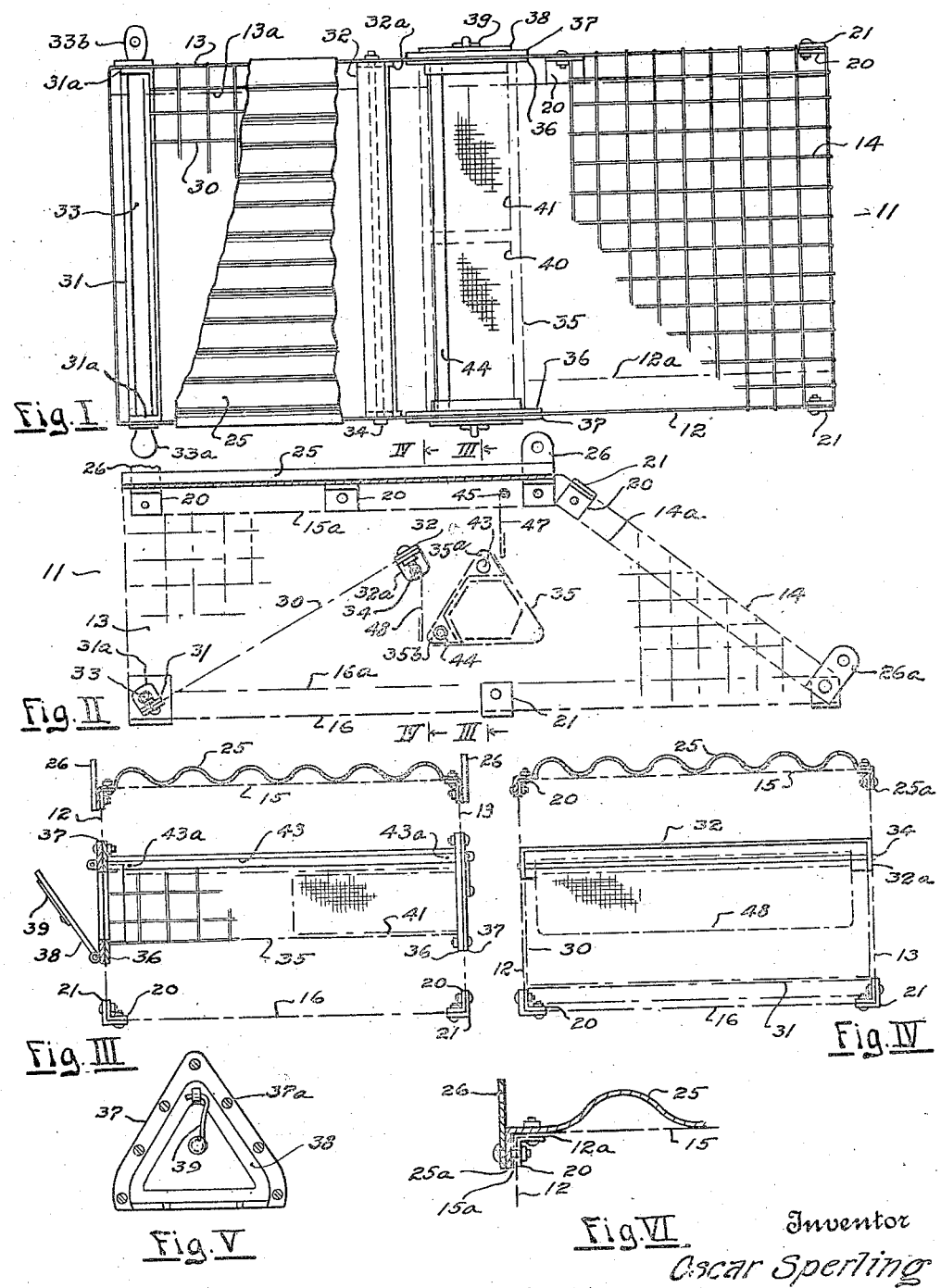

1,773,324

UNITED STATES PATENT OFFICE

OSCAR SPERLING, OF NEW YORK, N. Y.

FISH TRAP

Application filed January 12, 1929. Serial No. 332,142.

This invention relates to devices for catching fish, and it appertains more especially to such contrivances which are adapted to be set on the bottom of the waters wherein they are immersed.

One of the objects of the invention is the production of an improved device of the character referred to, that will both entice the fish and afford them easy entrance into the trap as well as prevent their escape.

Another object is to produce a device of the kind specified, from which the entrapped fish can, without injury to the same, be quickly removed, but only by authorized persons.

A further object is to provide a device of the class described having a holder convenient to charge with various sorts of bait, from the trap's exterior, and without lifting the latter out of the water.

Still another object consists in producing a device of the type mentioned so arranged that it may be shipped or stored in knockdown condition, and which can be readily assembled by anyone of average intelligence.

A still further object is the provision of a device of the nature set forth so constructed that it will adjust itself to the direction of the current, and to offer the least obstruction to water flowing past the same.

A general object is to furnish an effective device for the purpose in view which shall be durable, strong and light; composed of few simple parts capable of machine production and easily put together so as to be amenable to low cost of manufacture and repairs.

Other objects and advantages of the invention will become apparent as the specification proceeds.

With the aforesaid objects in view, the invention consists of the novel combinations and arrangements of parts hereinafter described in their preferred embodiments, pointed out in the subjoined claims and illustrated on the annexed drawing, wherein like parts are designated by the same reference characters throughout the several views.

In the drawing:—

Figure I is a top plan view of a preferred form of this improved fish-trap, parts being broken away;

Fig. II is a vertical sectional elevation taken longitudinally of the device shown by Fig. I;

Fig. III is a transverse section taken substantially on the line III—III of Fig. II, looking in the direction of the arrows;

Fig. IV is a similar section, taken on the line IV—IV, looking in the same direction.

Fig. V is a detail, face view, on a somewhat enlarged scale, of a closure appearing in Figs. I and III; and Fig. VI is an enlarged sectional detail of a corner connection shown at the upper left hand portion of Fig. III.

Generally described, the device under consideration includes in its organization a reticulated, substantially rectangular prism-like body having one end open. From the lower edge of the latter reaches upwardly and inwardly into this body, which constitutes the trap proper, an inclined partition hinged so as to afford access into the interior of the trap. A compartmental cage communicating endwise with the trap body's exterior sides, is interposed therebetween in spaced relation to the partition's inner edge. Bait and lure holding containers, received within the compartments of the cage, are retained therein by closures covering the ends thereof. Trap doors pivoted in proximity to the body's upper side and the partition's inner edge, coact with the aforesaid cage to shut off egress of the prey while affording easy ingress of the same. A shadow throwing member overlying the top of the body and providing lodgement for marine insect harboring weeds, serves also to entice the fish into the trap. Means are furnished whereby the trap may be hoisted without undue strain thereon.

The advantages of the invention as here outlined are best realized when all of its features and instrumentalities are combined in the one and same structure, but, useful devices may be produced embodying less than the whole.

It will be obvious to those skilled in the art to which the invention appertains, upon becoming conversant with the details thereof, that the same may be incorporated in several different constructions. The accompanying drawing, therefore, is submitted merely as showing the preferred exemplification of the invention.

Referring now to the before named views for a detailed description of the form of the invention illustrated, the same comprises an approximately quadrilateral body, denoted as a whole by the reference numeral "11". The prismoidal body in question, when viewed from the top or either end thereof, has a rectangular appearance, while the longitudinal side walls 12, 13, as seen in elevation, are trapezoidal. This is because the transverse wall 14 of said body, inclines, as clearly shown in Fig. II, from the lower right hand corner of the body, upwardly and inwardly towards the middle portion of the top wall 15.

The aforementioned walls as well as the bottom 16 of the said body, are provided along their edges with right angular lips or flanges, of which those designated 15ª, 16ª, on the top and bottom walls 15 and 16 respectively, are made to take over the corners of the side walls 12, 13, on the outside thereof, while flanges 12ª, on the last named walls (see Fig. VI) find abutment against the inside faces of the walls 15, 16, in close adjacency to their corner portions. As depicted at 14ª the sloping end wall 14 is also furnished with similar lips as those on the top wall, but superlying the wedge-shaped, and according to Fig. II, the right hand, portions of the said side walls.

The walls referred to, are by preference composed of rust proof wire netting, the meshes whereof are sufficiently large to permit of small size fish passing therethru. In order to hold the overlapping corners of the end, bottom and side walls together, angular clips 20, 21, are employed. These fitments are disposed interiorly and exteriorly, respectively, of the aforesaid corners, being secured thereto thru the agency of bolts with nuts, which clamp the wire netting flanges and wall sides intermediately of said clips.

Overlying the top wall 15, is a corrugated plate 25, the undulations whereof extend lengthwise of said top wall. The opposite longitudinal side edges of this plate are flattened and bent at right angles to the general plane of the corrugations, forming flanges 25ª, which in lieu of outside clips, externally encompass the lips 15ª of the said top wall. The same bolts which fasten the plate flanges 25ª and the inside clips 20, may be utilized to secure perforated hangers 26 in spaced relation to one another along the upper edge of the trap body. Other hangers 26ª are affixed direct to the exterior clips located at the acute angled corners between the end, side and bottom walls, that is, at the right hand end of the device, as viewed in Figs. I and II. The purpose of the aforementioned hangers 26 and 26ª, is to afford anchorages for hoisting slings when the trap is to be lifted out of the water, so as to distribute the weight of the body and the load of fish contained therein, at several supporting points. For the sake of clearness, the hangers in question have been omitted from Fig. I.

The inverted troughs formed at the underside of the plate 25 by the corrugations thereof constitute lengthwise running pockets in which find lodgment, sea-grass or weeds wherein marine insects and small crustaceans will take refuge. As the fish swims into the end of the trap opposite to its sloping transverse wall 14, which end is preferably left entirely open, the forenamed finny denizens, attempt with their mouths to reach thru the meshes of the netting sublying plate 25 and nibble at the water weeds or the small animals harbored in the troughs or pockets aforesaid. The fish are thereby tempted to swim further and further into the trap, until they have irretrievably passed beyond return-blocking gates more fully hereinafter described.

After the trap has been submerged in water for some time, marine growths will rapidly adhere to the sides thereof, virtually enveloping it with a sheath of vegetation, causing an obstruction against the tide or current, which has a tendency to shift the location of the trap along the sea bottom whereon it is placed. However, with the transverse wall 14 covered by algæ or like weeds, the on-rushing water not only is deflected upwardly as on an inclined plane over the top of the trap, but the current will also act to keep the latter in substantial parallelism with its direction of flow, thus obviating the proclivity of the trap to veer or move with the current.

At 30 is indicated an inclined partition extending upwardly and inwardly into the trap body. This partition, by preference, is made of wire netting the same as the other walls, being re-inforced at the lateral side edges thereof, by bands 31, 32, the end portions 31ª, 32ª, whereof are turned oppositely that is, upward and downward, respectively, as best seen from Fig. II. Thru appropriate openings in these end portions 31ª and 32ª, and thru the side walls 12, 13 of the main body of the trap are inserted rods 33, 34, one or both of which may be removable. It will be noticed that rod 33 is composed of a flattened bar provided with a manipulating head 33ª at one extremity, and having its other terminal 33ᵇ perforated for the reception of a padlock (not shown). From the foregoing will be understood that a poacher cannot gain access into the trap, unless in possession of a key to the lock. When bar 33 is removed, partition 30 can readily be swung up around the rod 34 as its pivotal axis, and the catch of fish caught in the trap, dumped out beneath the said partition thru the trap's open end.

Interposed between the side walls 12, 13, at a suitable distance from and in substantial parallelism with the inner edge of the partition 30, is a wire cage 35, conveniently triangular in cross-section, which, if desired, may be divided into major and minor compartments (35) and 35$^b$ respectively. Said cage is supplied at the ends thereof, with transverse flanges 36 disposed flush with the inner faces of the said side walls, and communicating with correspondingly shaped openings cut therein. Exteriorly of the last named walls, in opposition to the interior flanges, are companion flanges 37 held to the latter by suitable bolts or screws 37$^a$ passing between the meshes of the side walls. The outside flanges 37 are provided with doors 38 which may be hinged to the lower edges thereof. Instead of latches 39 as shown, doors 38 can be kept closed for instance by pad locks, to prevent unauthorized entrance into the compartments of the said cage.

Container baskets 40, 41, receivable within the major compartment, are capable of being lodged therein from either end of the cage 35. These containers which as shown may be polygonal in contour, are adapted respectively to hold live and dead bait, as minnows, and fish heads and entrails. By pulling the trap up to the water's surface and turning the same first on one and then on the other side, it is an easy matter to open the cage doors and push in or pull out the containers to charge or renew the bait therein. Into the upper-minor compartment 35$^a$, can be placed a receptacle 43, for a suitable oily or chemical material that will attract the fish by its smell. This receptacle may conveniently consist of an endwise capped length of pipe, having one or more perforations 43$^a$ thru which the odoriferous substance will be displaced in minute quantities by the water seeking its way into the tubular receptacle. The other minor compartment 35$^b$, at the lower corner of the cage 35 is preferable for the housing of a glass tube 44 coated on the inside wall surface thereof with some luminous matter such as radio-active paint, to catch the attention of and attract fish at some distance away. By virtue of the fact that the superlying plate 25 is opaque and throws a shadow across the trap's interior, the luminosity of the tube 44 is set off sharply under the water, even in broad daylight. It is obvious that under certain conditions, the before mentioned containers may be omitted, and the bait lodged directly in the cage 35, particularly if the latter is made of the same fine mesh wire netting as originally intended for the container baskets. It is also feasible to use only one of the cage doors 38, and to substitute a blank or doorless flange for the opposite one thereof, depending upon the size or dimensions of the trap.

At 45 is indicated a rod which reaches crosswise of the trap's upper middle portion, being carried by its extremities in the depending flanges 25$^a$ of the top plate 25. On said rod 45 and also on the fulcrum rod 34 for the partition 30, are hingedly supported gravity suspended flaps or gates 47, 48, respectively. The gates in question are arranged to swing freely inwardly from the slightest touch thereagainst by a fish nuzzling along to feed on the accumulations in the troughs or pockets aforesaid or otherwise inadvertently seeking entrance into the trap, while the outward movement of these gates is prevented by their lower edges contacting with the opposite sides of the cage 35. After a fish has been enticed or blundered into the trap's anterior chamber, e. g. the space formed intermediately of the partition 30 and the top wall 15, by the vegetable sea-growth and insects accumulating therein beneath the corrugated plate 25, the fish is further decoyed by the irridescence from the tube 44, the sight of the minnows in one of baskets 41, 42, and the exudation from the odoriferous matter in the containers, to pass beyond the gates. The fish entrapped on the inner side of the latter are irretrievably imprisoned, and can be liberated or removed only by the lifting up of the lower or front edge of the said partition 30.

By reason of the fact that the top and bottom walls of the trap are made considerably wider in proportion to the sides thereof, the latter can be nested within and flat against the first named walls, when the device is disassembled for convenience of shipment. The provision of the corner clips 20, 21, enables the assembling of the various walls to be expeditiously performed. Similarly, the placing of the cage 35 in position with its coacting flanges between the side walls 12, 13, is the work of but a few moments of time.

While a certain preferred embodiment of this device has been shown and described, it will be understood that changes in the form, arrangements, proportions, sizes and details thereof may be made, without departing from the scope of the invention as defined by the appended claims.

Having described my invention, what I desire to secure by Letters Patent and claim is:—

1. A trap having an open end, a partition inclined upwardly and inwardly of the trap from near the lower edge of said end, a bait container disposed crosswise of said trap in spaced relation to the inner upper edge of said partition, and a gate coacting with the last named edge and said container to shut off egress therebetween by way of such space.

2. A trap having an open end, a partition extending inwardly from said end defining the entrance into the trap, a bait holder disposed crosswise of said trap in spaced relation to the inner edge of said partition, and one-way gates co-acting with said holder serving to shut off egress between the latter and said edge, and between the holder and the upper portion of said trap.

3. A trap having a partition defining an entrance thereinto, a polygonal bait holder extending across the trap in proximity to said partition, a gate suspended with its free edge in coacting relation to a corner of said holder to control the exit past the same from said trap, and means affording unobstructed access into and thru the bait holder in either direction from the exterior of the said trap.

4. A trap having a contracted vestibular entrance leading to a main chamber, a polygonal bait holder within said main chamber extending crosswise of the trap and providing openings communicating with the opposite exterior sides of the trap, gates within the main chamber coacting with adjacent corners of said holder controlling ingress to and egress from said trap, and a door for each of said openings operable from the outside of the said trap.

5. A trap having an open end and a sloping wall opposite thereto, an inclined partition extending inwardly of the trap from its open end, a bait holder spaced from the inner edge of said partition, a gate hinged to coact with said holder on the side thereof facing said sloping wall, another gate pivoted in coacting relation to the side of the holder turned towards the trap's open end, said gates serving to shut off egress from the trap past the said holder, and an opaque member overlying the top of the said trap.

6. A trap having an inlet thereinto at one end, a compartmental bait and lure holder extending transversely across the trap in proximity to the inner portion of said inlet, said holder communicating with the exterior of said trap at opposite sides thereof, a gate serving to shut off egress between the trap's interior and the said holder, and closures for the exterior communications of the latter.

7. A trap having an open end, an inclined partition extending inwardly of the trap from the lower portion of its said end, means for pivotally supporting said partition adjacent the inner edge thereof, a bait holder in proximity to the latter, a gate shutting off egress from the trap's interior past said holder, and other means for locking the outer end of the said partition.

8. A trap having an open end, a partition extending inwardly of the trap from said end, a compartmental cage disposed transversely across said trap in communication with the exterior thereof, a gate shutting off egress from the trap's interior past said cage, bait and lure containers insertible into the latter thru its exterior communication, and means for retaining said containers in their assigned positions.

9. A fish trap composed of reticulated material, a partition extending inwardly of the trap defining an ante-chamber having an upwardly inclined floor established by said partition, a bait holder disposed beyond the latter, a gate shutting off egress from the trap's interior into said chamber, and a member overlying said trap affording lodgment for fish-food, the same being reached thru the reticulations in the wall of the trap underlying said member by the fish passing into the ante-chamber.

10. A fish trap composed of reticulated elements, the same being provided along the side edges thereof with right angularly disposed flanges, the latter taking over and under the adjoining sides of the elements at their meeting corners, paired clips arranged in spaced relation exteriorly and interiorly around said corners, and fastening means passing thru each pair of said clips and the corners of the elements included therebetween.

11. A trap having reticulated top and side walls, a partition forming a contracted antechamber beneath the trap's top wall, a corrugated plate provided with flanges adapted to overlie said top wall and part of the side walls, said plate serving to darken said chamber, and clips on the inner side of the latter coacting with said flanges to tie the structure together.

OSCAR SPERLING.